Sept. 11, 1945.  M. A. GLEESON  2,384,672
PRESSURE SEALING JOINT
Filed Oct. 27, 1943   2 Sheets-Sheet 1
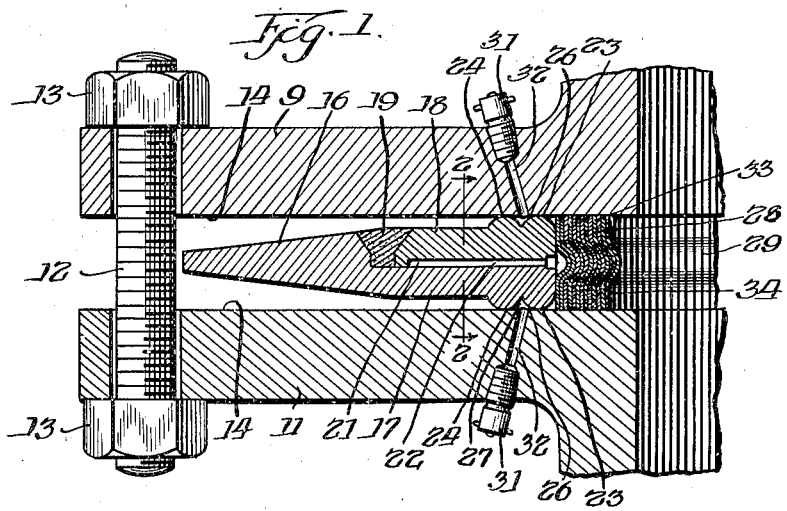
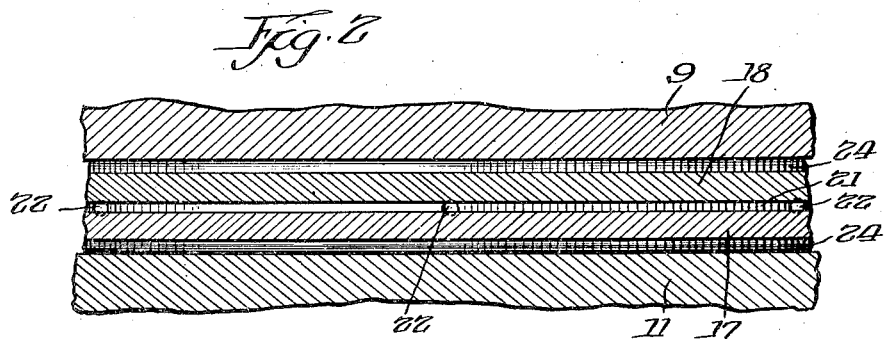
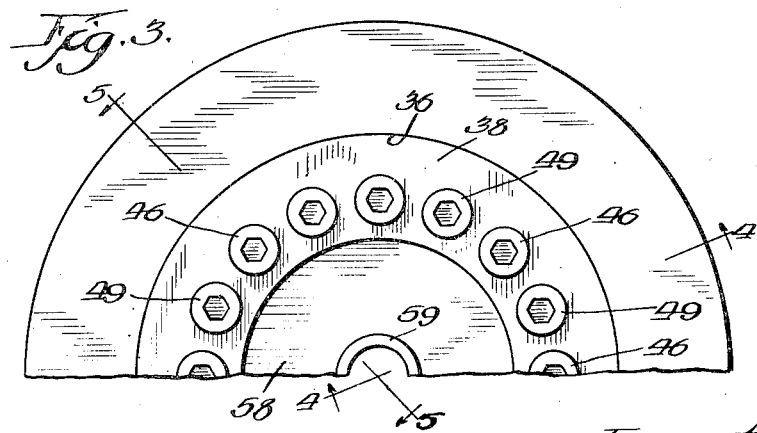
Inventor:
Murray A. Gleeson
By Joseph O. Lange Atty.

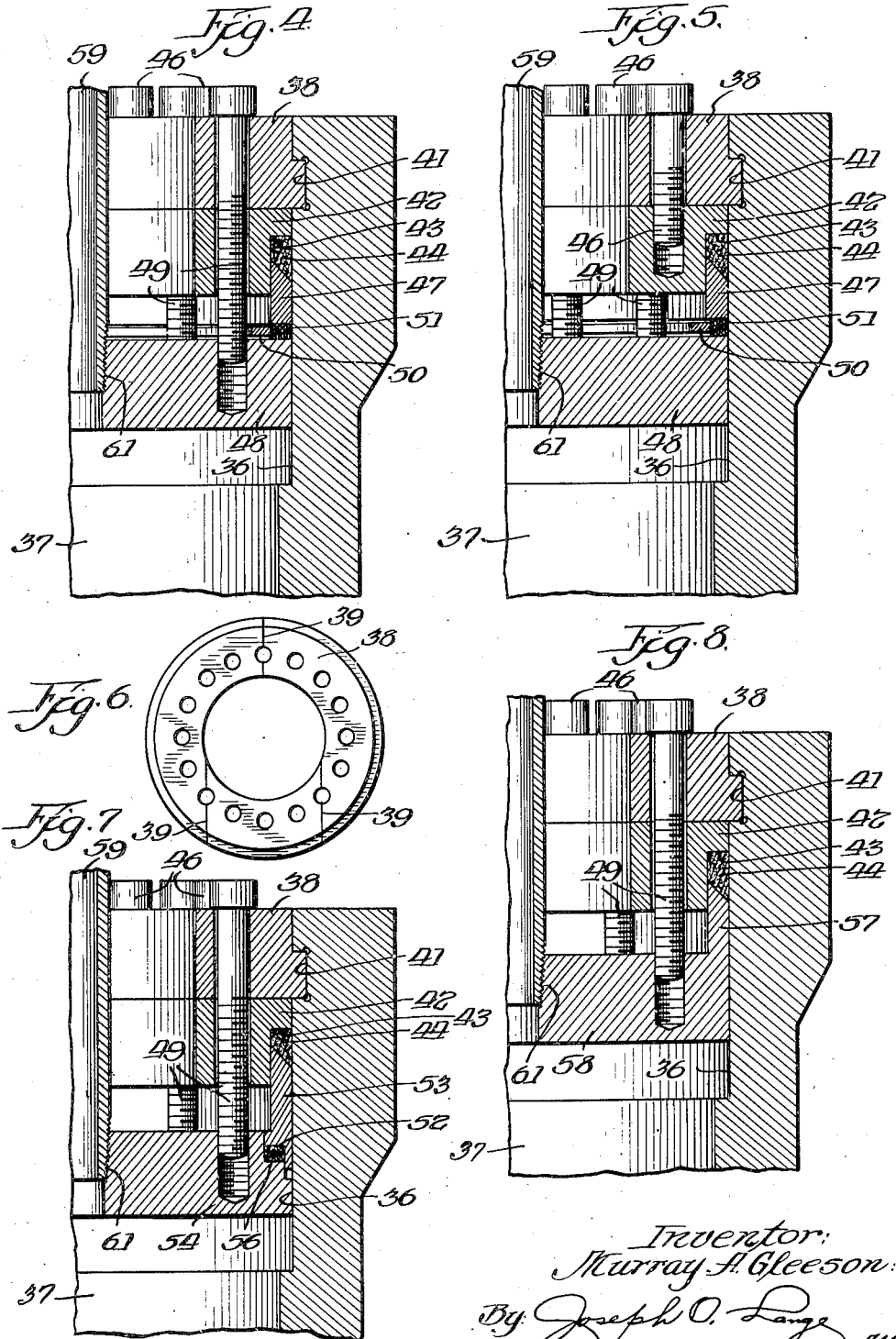

Patented Sept. 11, 1945

2,384,672

UNITED STATES PATENT OFFICE 2,384,672

PRESSURE SEALING JOINT

Murray A. Gleeson, Chicago, Ill., assignor to Crane Co., Chicago, Ill., a corporation of Illinois Application October 27, 1943, Serial No. 508,084

5 Claims. (Cl. 285—137)

This invention relates to improvements in pressure sealing joints and method of sealing same and is more particularly concerned with joints in which the gasket, packing or other sealing means is forced into tight engagement with the sealing wall of the joint responsive to pressure exerted by the medium to be confined; and has for an object the provision of a pressure sealing joint which is simple and inexpensive in construction and reliable in use.

A further object of this invention is to provide a pressure sealing joint suitable for use with relatively high temperatures and pressures. In the use of pressure sealing means heretofore employed with high temperatures it has been difficult to provide leakproof joints due to rapid fluctuations in temperature, as a sudden drop in temperature usually causes the sealing gasket to contract more rapidly than the parts confining same due to their necessary difference in material and relative size. It is, therefore, very desirable and in some instances essential to provide a method and means in which the contraction of the sealing material substantially coincides with the contraction of the means confining same to prevent leakage therebetween. A relatively simple method of producing this result consists in the provision of an insulating means interposed between the gasket and the medium being confined. An insulating means interposed between the sealing material and the fluid medium may also be employed as a protection means for the sealing material to prevent direct contact of the fluid medium against same, thereby permitting the use of a sealing means embodying the most suitable kind of material, or form, which otherwise might be impracticable due to high temperatures, chemical action, etc.

A further object of this invention is to provide an expansible gasket having means defining circular sealing grooves adapted to receive a sealing material, together with insulating means interposed between the gasket and the medium being controlled.

This invention further contemplates the provision of an expansible gasket having a pair of circular seating surfaces disposed on each side thereof and in which a sealing groove adapted to receive a sealing medium is disposed between each pair of seating surfaces. The sealing medium may be applied to the gasket when mounting same, or it may be applied through an aperture leading thereto after the gasket is mounted, or the medium being confined or controlled may serve as the sealing medium.

This invention further contemplates the provision of pressure sealing means suitable for use in mounting bonnets, plugs, or the like in leakproof engagement with valve bodies, pipes, or containers.

My invention embodies other novel features, details of construction and arrangement of parts which are hereinafter set forth in the specification and claims and illustrated in the accompanying drawings, forming part thereof, wherein:

Fig. 1 is a fragmentary transverse sectional view showing a pressure sealing joint embodying my invention.

Fig. 2 is a sectional view taken along the line 2—2 of Fig. 1.

Fig. 3 is a fragmentary end view showing a modified form of my invention.

Fig. 4 is a sectional view taken along the line 4—4 of Fig. 3.

Fig. 5 is a sectional view taken along the line 5—5 of Fig. 3.

Fig. 6 is a detail view showing a split ring.

Fig. 7 is a fragmentary sectional view showing a further modification of my invention.

Fig. 8 is a fragmentary sectional view showing a further modification of my invention.

Referring now to the drawings for a better understanding of this invention and more particularly to Figs. 1 and 2 therein, I show a flanged joint comprising flange members 9 and 11 secured to each other by means of studs 12 and nuts 13 and having finished faces 14 adapted to receive a gasket 16 therebetween. The gasket is preferably formed of parts 17 and 18 which are welded together at 19 to provide an annular chamber 21 and passages 22 leading radially thereto. Annular projecting portions 23 and 24 are formed on each side of the gasket and adjacent the inner periphery thereof for engagement with the faces 14 of the flange members and define outwardly facing annular grooves 26 adapted to receive a sealing medium 27 formed of material suitable for use with the medium being confined. A protection material 28 is engaged between the faces 14 and between the gasket and the interior chamber 29 to protect the gasket from deleterious action of the fluid medium being confined. The sealing medium 27 may be applied in the grooves 26 prior to mounting of the gasket between the flanges, or it may be forced into the grooves after the gasket is mounted by means of the check valve fittings 31 and feed passages 32.

In the use of the type of joint thus shown and described, the pressure of the fluid medium acts within the chamber 21 to expand the gasket and thereby move the projecting portions 23 and 24 into tight engagement with the faces 14. Due to the position of the chamber 21 with respect to the annular portions 23 and 24, the portions 24 engage the faces more closely than the portions 23. Any leakage past the annular portions 23 acts against the sealing material 27 within the grooves 26 to seal the contact surfaces between the annular portions 24 and the faces 14.

The protection material 28 provided in this form of the invention is particularly suitable for use in insulating the gasket from high steam temperatures and comprises alternate layers of spirally wound steel 33 and asbestos 34. Heretofore, a sudden drop in temperature would cause gaskets of this type to contract more rapidly than the parts confining same and cause leakage therebetween. By providing an insulating material between the gasket and the fluid medium, the rate of contraction of the gasket coincides more closely with the rate of contraction of the parts confining the gasket and thereby provides a more effective sealing engagement. The insulating means 28 also protects the sealing material 27 from deleterious action resulting from relatively high temperatures.

Referring now more particularly to Figs. 3 to 6 in the drawings, I show a modified form of this invention adapted for use in sealing a wall of an opening 36 leading from a fluid confining chamber 37 and comprising a retaining ring 38 split at 39 for mounting in an annular retaining groove 41 formed in the wall of the opening 36. A packing retaining member 42 having a packing recess 43 to receive packing 44 is held against outward displacement by the retaining ring and is secured thereto by screws 46. A gland 47 is provided for engagement with the packing 44 and is held in initial tight engagement therewith by means of a gland piston member 48 and screws 49 which extend through the retaining ring 38 and packing retaining member 42 for threaded engagement in the piston member. A spiral wound gasket 51 is interposed between the gland 47 and piston member 48 to protect the packing from injurious action from the fluid medium. The gasket is held in coiled position against the wall of the opening 36 by a split flexible ring 50 formed of metal.

While ordinary packing formed of asbestos fibers and graphite is suitable for use in sealing joints for relatively high pressures it is desirable to protect same from relatively high temperatures and this is accomplished by the employment of a gasket 51 having heat insulating properties. The packing is maintained in tight sealing engagement with the wall of the opening 36 by the pressure of the fluid medium within the confining chamber 37 acting upon the piston member 48 to press the gland 47 into the packing recess 43 and against the packing.

Fig. 7 shows a further modification of this invention wherein an annular chamber 52 is formed between a gland 53 and piston member 54 to receive and confine on all sides a heat insulating gasket 56.

Fig. 8 shows a further modification in which the gland portion 57 is formed integral with a cylindrical piston portion 58.

In the event the forms of my invention shown in Figs. 3 to 8 are to be employed in a valve construction, a pipe 59 may be threaded into the gland piston member at 61 to receive a valve stem (not shown) and the outer end of the pipe can be sealed around the stem by the usual stuffing box (not shown). The modified forms shown in Figs. 3 to 8 could also be employed as pipe plugs in which event a pressure gage (not shown) could be secured to the outer end of the pipe 59.

While I have shown my invention in but four forms it is obvious to those skilled in the art that it is not so limited but is susceptible of various changes and modifications without departing from the spirit thereof of the appended claims.

I claim:

1. In a pressure sealing gasket for positioning between spaced apart flanges, the gasket being annularly arranged to form a chamber in direct communication with line pressure, a thickened annular portion of the gasket on either side of the chamber being provided to form an initial annular pressure seal with the flanges, and to provide initial internal annular contact of that portion of the walls of the chamber disposed between the annular portions, the said thickened annular portion having substantially rounded contact surfaces whereby the gasket may be suitably positioned when the flanges are dished under excessively high bolt loads.

2. In an integral pressure sealing gasket for positioning between spaced apart flanges, one portion of the gasket being annularly split on its inner periphery to form a chamber with the other portion of the gasket, the said chamber being in communication with line pressure and closed on its outer periphery, peripheral sections of each of the annular portions of the gasket being thickened to form an annular contact surface with the flanges and to provide the initial annular line contact with the flanges of the outer portion of the walls of the chamber disposed therebetween.

3. In a pressure sealing gasket for positioning between spaced apart flanges, the gasket being annularly divided to form a chamber in direct communication with line pressure, the gasket on either side of the chamber being thickened to form an initial annular contact surface with the inner peripheral portion of the flanges and to provide initial internal annular contact of the outer surface portion of the walls of the chamber disposed therebetween, the outer annular portion of the gasket being of substantially thinner annular cross-section and having fluid sealing means therebetween serving as an annular hinge to form the sealed outer limits of the closed portion of the chamber.

4. In a pressure sealing gasket for positioning between bolted spaced apart flanges, the gasket being annularly arranged to form an annularly closed chamber in communication with line pressure, a portion of the gasket on either side of the chamber being thickened to form an initial annular contact surface with the flanges and to provide initial annular contact of the thickened portion of the walls of the chamber disposed therebetween, the initial annular contact surface of the thickened portion of the gasket being substantially rounded whereby the gasket may be adjustably positioned to form substantially a line bearing when the said flanges are dished under the influence of high bolt loads.

5. In a pressure sealing joint, the combination including oppositely disposed flanges, an expansible gasket responsive to pressure exerted by the medium being confined for maintaining tight sealing engagement within the flanges, a plurality of annuli with inner thickened portions, one of the annuli being nested within the other to form the gasket, each of the annuli having an annular groove between the inner and outer peripheries of the said thickened portions, sealing means for attaching the annuli, heat insulating means interposed between the said inner thickened portions and the medium being confined, the said insulating means permitting flow of the confined medium between the said thickened annuli.

MURRAY A. GLEESON.